US007443335B2

(12) United States Patent
Kai et al.

(10) Patent No.: US 7,443,335 B2
(45) Date of Patent: Oct. 28, 2008

(54) RADAR SYSTEM

(75) Inventors: Koichi Kai, Tokyo (JP); Atsushi Okamura, Tokyo (JP); Rokuzou Hara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 215 days.

(21) Appl. No.: 11/398,709

(22) Filed: Apr. 6, 2006

(65) Prior Publication Data

US 2007/0115169 A1 May 24, 2007

(30) Foreign Application Priority Data

Nov. 22, 2005 (JP) ............................ 2005-336748

(51) Int. Cl.
*G01S 13/00* (2006.01)
*G01S 13/08* (2006.01)

(52) U.S. Cl. ...................... 342/70; 342/104; 342/147

(58) Field of Classification Search .................. 342/73, 342/74, 75, 77, 80, 104, 105, 107, 113, 115, 342/117, 133, 149, 174, 175, 195, 70–72; 370/339

See application file for complete search history.

(56) References Cited

U.S. PATENT DOCUMENTS

| 3,618,008 | A | * | 11/1971 | Kern | ............................ 342/56 |
|---|---|---|---|---|---|
| 4,224,507 | A | * | 9/1980 | Gendreu | ....................... 235/412 |
| 4,472,718 | A | * | 9/1984 | Ohashi et al. | ................. 342/148 |
| 4,524,359 | A | * | 6/1985 | Champagne | ................... 342/89 |
| 4,589,610 | A | * | 5/1986 | Schmidt | ..................... 244/3.19 |
| 5,075,694 | A | * | 12/1991 | Donnangelo et al. | ......... 342/455 |
| 5,430,445 | A | * | 7/1995 | Peregrim et al. | ........... 342/25 C |
| 5,631,653 | A | * | 5/1997 | Reedy | ............................ 342/62 |
| 5,936,549 | A | * | 8/1999 | Tsuchiya | ...................... 340/903 |
| 6,670,911 | B2 | * | 12/2003 | Kishida et al. | ................. 342/70 |
| 6,731,235 | B2 | * | 5/2004 | Kishida et al. | ............... 342/128 |
| 6,842,152 | B2 | * | 1/2005 | Kikuchi | ....................... 343/713 |
| 6,900,754 | B2 | * | 5/2005 | Ono et al. | .................... 342/158 |
| 7,061,424 | B2 | * | 6/2006 | Kuroda et al. | .................. 342/70 |

FOREIGN PATENT DOCUMENTS

| JP | 09-043344 A | 2/1997 |
|---|---|---|
| JP | 2001-201566 A | 7/2001 |
| JP | 2002-228749 A | 8/2002 |

OTHER PUBLICATIONS

Skolnik (Introduction to Radar Systems 2nd Ed., 1980).*

* cited by examiner

*Primary Examiner*—Thomas H. Tarcza
*Assistant Examiner*—Peter M Bythrow
(74) *Attorney, Agent, or Firm*—Sughrue Mion, PLLC

(57) ABSTRACT

To obtain a radar system capable of obtaining an appropriate angular precision by calculating an angle error based on distributions of relative speeds and angles of reflecting points, and of obtaining the appropriate angular precision including an axis deviation angle by simultaneously calculating the angle error and the axis deviation angle. A radar system mounted on a movable body is provided with a radar device that calculates relative speeds and azimuth angles of plural reflecting points; an azimuth angle error estimating device that estimates an error of the azimuth angle calculated by the radar device based on the relative speeds and the azimuth angles of the plural reflecting points; and a correcting device that corrects the azimuth angle calculated by the radar device by using the azimuth angle error estimated by the azimuth angle error estimating device.

16 Claims, 5 Drawing Sheets

RADAR SYSTEM

BACKGROUND OF THE INVENTION

1. Field of the Invention

The present invention relates to a radar system which calculates an error of an azimuth angle of a radar device that uses reflection of propagation waves such as radio waves, sound waves, or light waves, to correct the azimuth angle.

2. Description of the Related Art

In recent years, development have been made on a radar device which is mounted on a movable body such as a vehicle, and has such a structure that a reflecting point of an obstacle or the like running in a traveling direction is detected to implement functions of speed control and collision prevention. In such the radar device, for the purpose of the speed control and collision prevention, it is required to obtain an azimuth angle, in addition to a distance with respect to the reflecting point and a relative speed between the own vehicle and the obstacle (or between reflecting points ?), to select an object traveling in the same traffic lane as the own vehicle. Various radar systems have been proposed to obtain the azimuth angle.

In the conventional radar device, the reflected waves are received by two or more antennas, and determination of the angles of the reflected waves are performed by using the receiving intensity of the reflected waves and transmission angles of the respective antennas (for example, refer to JP 09-43344 A).

In another conventional radar device, narrow beams are scanned in a horizontal direction to determine an angle of a reflecting point based on the receiving intensity of the reflected wave between two beams and the transmission angles of the respective beams (for example, refer to JP 2001-201566 A). To obtain the transmission angles of the respective scanning beams, an angle sensor may be used, for example.

In still another conventional radar device, an amount of axis deviation with respect to the traveling direction of the movable body on which a radar is mounted, is estimated and corrected to thereby correct the angle error caused by the axis deviation (for example, refer to JP 2002-228749 A).

In such the radar systems described above, the mechanical and electrical precision of the devices causes an azimuth angle error. In the conventional radar device, differences in the electric properties of the respective antennas cause a receiving intensity error, and as a result, an error occurs in the determination result of the azimuth angle of the reflecting point. In the another conventional radar device, since the error of the angle sensor causes an error in the transmission angle of the respective beams, an error occurs in the determination result of the azimuth angle of the reflecting point. In the still another conventional radar device, the amount of axis deviation with respect to the traveling direction of the movable body, which mounts the radar thereon, is estimated. However, since the azimuth angle error is not considered, the error may be caused in the amount of axis deviation when there is the azimuth angle error.

Manufacturing variations may be adjusted at the time of the manufacturing, but the adjustment may lead to an increase in cost, and deterioration with time may cause a mechanical or electrical error. Further, there is a problem of an increase in cost to minimize the error caused by the deterioration with time.

SUMMARY OF THE INVENTION

The present invention has been made to solve the problems described above, and has an object to obtain a radar system capable of obtaining an appropriate angular precision by calculating an angle error based on a relative speed between reflecting points and angle distribution with respect to the reflecting points, and of obtaining the appropriate angular precision including an axis deviation angle by simultaneously calculating the angle error and the axis deviation angle.

A radar system according to the present invention is the radar system to be mounted on a movable body, and includes: a radar device that calculates relative speeds and angles of plural reflecting points; and an angle error estimating device that estimates errors of the angles calculated by the radar device based on the relative speeds and the angles of the plural reflecting points.

According to the radar system of the present invention, there may be obtained such an effect that the appropriate angular precision may be determined by calculating angle error based on a relative speed between reflecting points and angle distribution with respect to the reflecting points, and of obtaining the appropriate angular precision including an axis deviation angle by simultaneously calculating the angle error and the axis deviation angle.

DESCRIPTION OF THE PREFERRED EMBODIMENTS

First Embodiment

Figure 1:
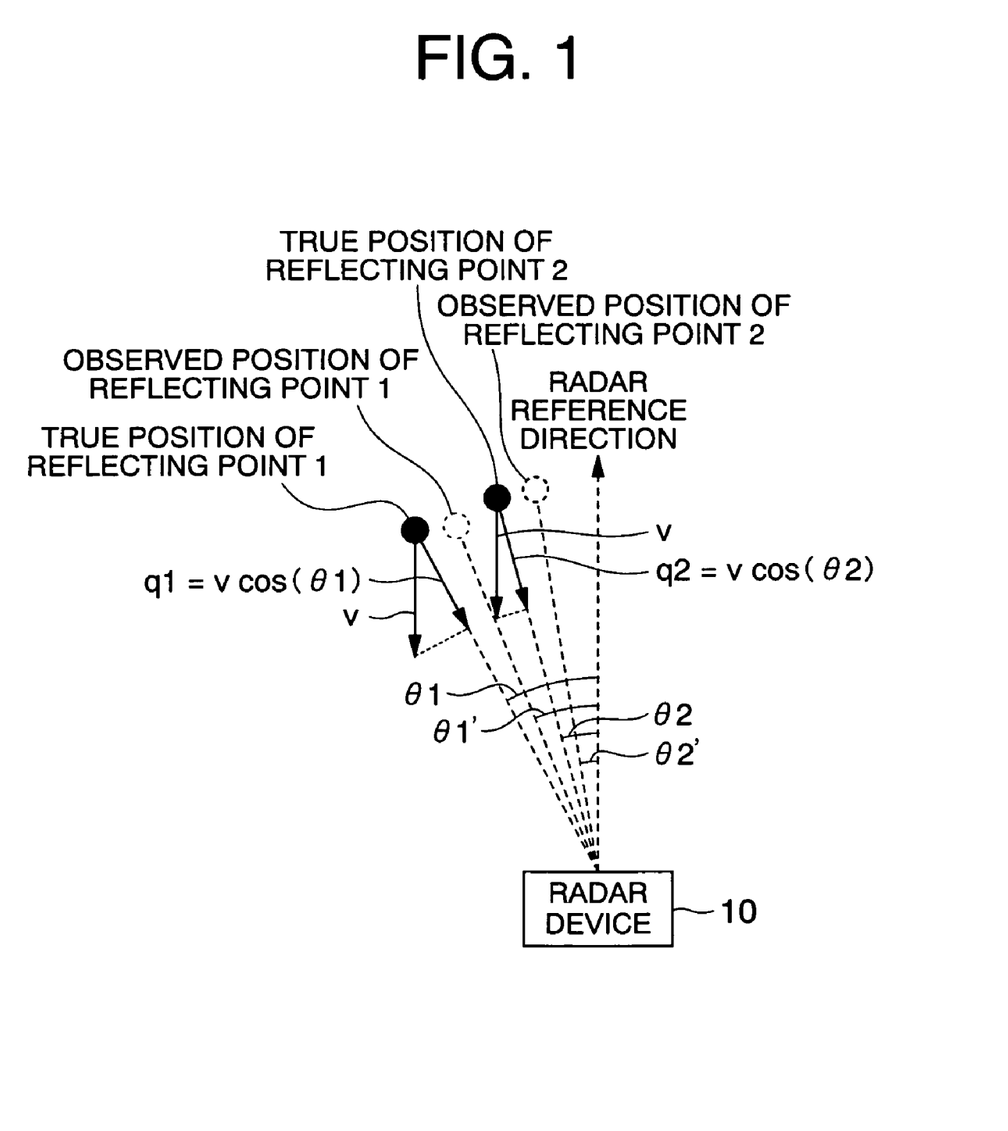
FIG. 1 is a diagram for explaining a principle of operation of a radar device of a radar system according to a first embodiment of the present invention.

A radar system according to a first embodiment of the present invention will be described with reference to FIGS. 1 through 3. FIG. 1 is a diagram for explaining a principle of operation of a radar device of the radar system according to the first embodiment of the present invention. Note that identical reference symbols indicate identical or corresponding components in the drawings.

In FIG. 1, a radar device 10 is mounted on a movable body such as a vehicle. Reflecting points 1 and 2 are radar-wave reflecting points detected by the radar device 10.

The radar device 10 detects another vehicle or obstacles such as roadside objects, existing in a traveling direction of the movable body. When the radar device 10 detects another vehicle or obstacles, the detection result is output to a device such as a car-to-car distance maintaining device or an auto navigator mounted outside the radar device 10, and used for the purposes of controlling speed and improving a safety of the vehicle.

To achieve such purposes, the radar device 10 has a function of calculating relative distances, relative speeds, and azimuth angles of the reflecting points 1 and 2. The radar device 10 has been widely used as, for example, a millimeter-wave on-vehicle radar, and its structure and operation are widely known and thus a description thereof is omitted here.

Here, the movable body mounting the radar device 10 thereon is assumed to travel at an unknown speed "v" in its traveling direction. The radar device 10 has a predetermined radar reference direction. The radar reference direction is the reference direction of azimuth angles obtained by observing reflectors. For ease of explanation, it is assumed that the movable body goes straight ahead in the traveling direction.

An azimuth-angle-error estimation method according to the present invention may be used to estimate not only the angle error in an azimuth direction but also the angle error in an elevation direction. However, for ease of explanation, only an azimuth component is described here.

In the first embodiment, the azimuth angle error is assumed to be the error expressed by a primary expression, represented by the following formula (1).

$$\theta' = a \cdot \theta \quad (1)$$

In the formula, $\theta$ indicates a true azimuth-angle value, $\theta'$ indicates an observed azimuth-angle value, and "a" indicates a constant expressing the amount of error. It has been assumed that the azimuth angle error is expressed by the primary expression, but even when the azimuth angle error is expressed by the expression, which is complicate more than the primary expression, the same principle can be obtained.

For ease of explanation, it is assumed that both the reflecting points 1 and 2 remain stationary and the movable body goes straight ahead at a speed "v". This case is equivalent to a case where both the reflecting points 1 and 2 travel at the speed "v" while the movable body remains stationary. When q1 indicates the relative speed of the reflecting point 1 of the components in the radar emission direction detected by the radar device 10 (the relative speed with respect to the radar device 10), q2 indicates the relative speed of the reflecting point 2 in the radar emission direction detected by the radar device 10 (the relative speed with respect to the radar device 10), θ1 indicates the true azimuth-angle value of the reflecting point 1, θ2 indicates the true azimuth-angle value of the reflecting point 2, θ1' indicates the observed azimuth-angle value of the reflecting point 1 detected by the radar device 10, and θ2' indicates the observed azimuth-angle value of the reflecting point 2 detected by the radar device 10, the relationships expressed by the following formulae (2) and (3) are established among v, θ1, θ1', q1, θ2, θ2', and q2, as apparent from FIG. 1.

$$q1 = v\cos(\theta 1) = v\cos(\theta 1'/a) \quad (2)$$

$$q2 = v\cos(\theta 2) = v\cos(\theta 2'/a) \quad (3)$$

In the following description, a term "relative speed" indicates the relative speed of the components in the radar emission direction unless otherwise stated.

The formulae (2) and (3) are simultaneous equations including two unknowns "v" and "a". When the formulae (2) and (3) are modified so as to delete "v", the following formula (4) is established.

$$q1/q2 = \cos(\theta 1'/a)/\cos(\theta 2'/a) \quad (4)$$

The formula (4) is an equation including only one unknown "a", and "a" is determined by solving the formula (4) for "a". In other words, at least two observed values of the reflecting points 1 and 2 are combined so that the azimuth angle error may be autonomously calculated from only values observed with radar waves.

Figure 2:
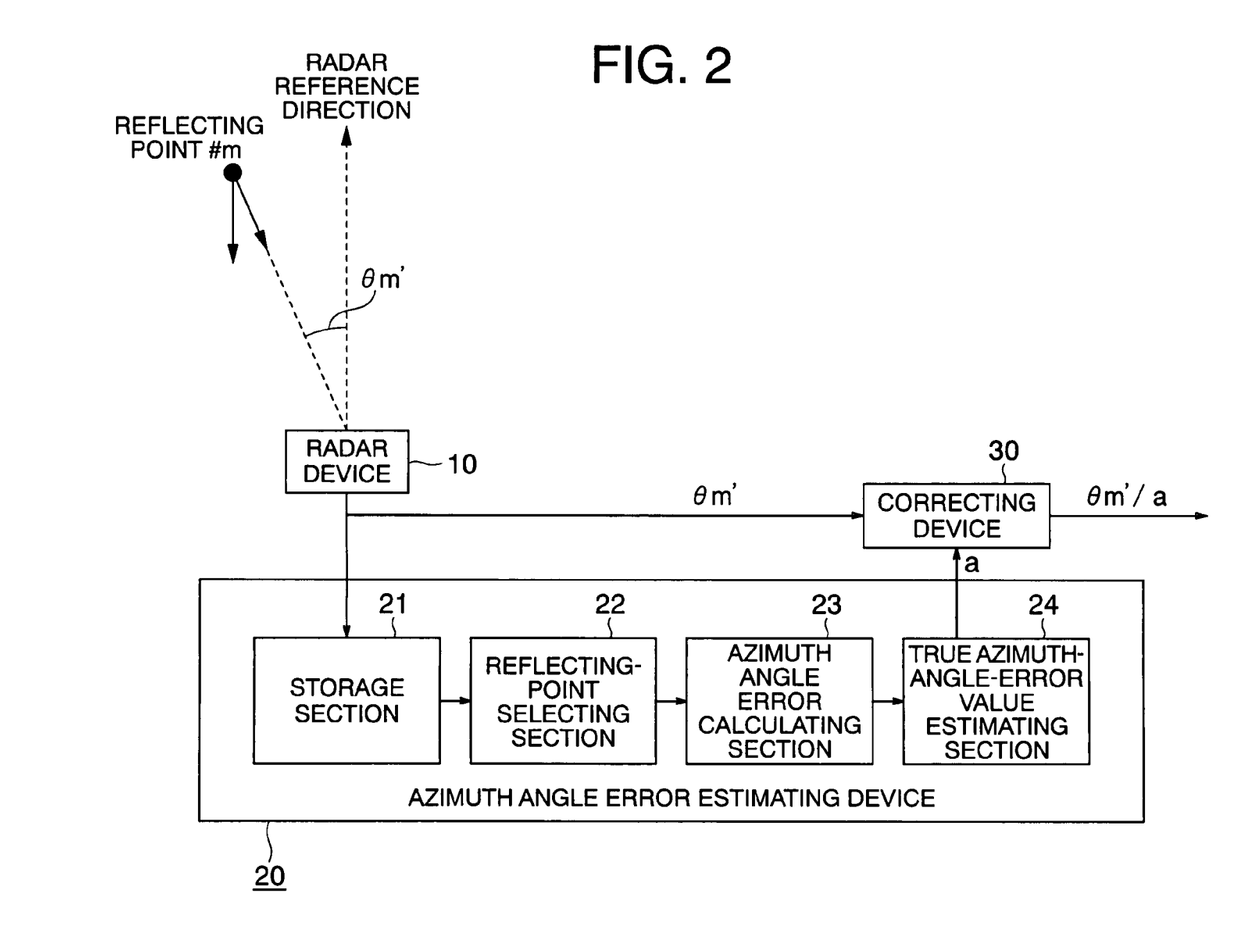
FIG. 2 is a block diagram showing a structure of the radar system according to the first embodiment of the present invention.
Figure 3:
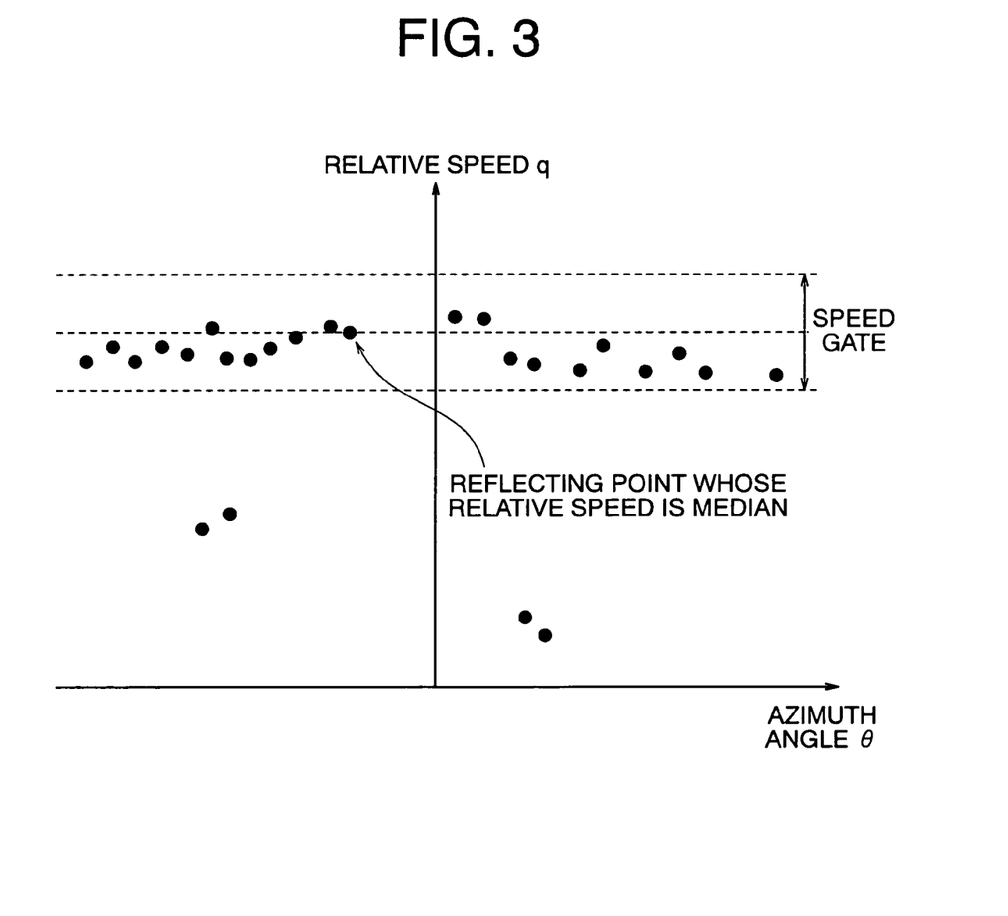
FIG. 3 is a diagram showing an example of distributions of relative speeds and azimuth angles of reflecting points detected when the radar system according to the first embodiment of the present invention is mounted on a vehicle traveling along a traveling lane on a road.

FIG. 2 is a block diagram showing a structure of the radar system according to the first embodiment of the present invention.

In FIG. 2, the radar system according to the first embodiment of the present invention is functionally equivalent to the radar system described in the above explanation of the principle of operation. Provided in the radar system are a radar device 10 having an antenna and a function of correcting an antenna direction; azimuth-angle-error estimating device 20 which estimates an azimuth angle error of the radar device 10; and a correcting device 30 which corrects an observed azimuth-angle value of a reflector based on the observed value calculated by the radar device 10 and the estimated azimuth-angle-error value calculated by the azimuth-angle-error estimating device 20, and outputs the correction result.

In the azimuth-angle-error estimating device 20, a storage section 21, a reflecting-point selecting section 22 and azimuth-angle-error calculating section 23, and an azimuth-angle-error value estimating section 24 are provided.

The storage section 21 stores observed values such as relative speeds and azimuth angles of the reflecting points, which are calculated by the radar device 10. The reflecting-point selecting section 22 selects, from among observed values of the reflecting points stored in the storage section 21, observed values to be used for the azimuth-angle-error calculation. The azimuth-angle-error calculating section 23 uses the observed values selected by the reflecting-point selecting section 22 to calculate the azimuth angle error. When plural azimuth angle errors (candidate values for the azimuth angle error) are calculated by the azimuth-angle-error calculating section 23, the azimuth-angle-error value estimating section 24 estimates true values of the azimuth angle error by using the plural azimuth angle error candidate values.

Note that each of the above components may be directly configured by hardware such as an element or a circuit for implementing a predetermined function and process, or may be configured by software using a general-purpose CPU, DSP, or the like.

The correcting device 30, as described above, corrects the observed azimuth-angle value of the reflector based on an observed value θm' detected by the radar device 10 and the estimated azimuth-angle-error value "a" calculated by the azimuth-angle-error estimating device 20, and outputs the correction result. The output of the correcting device 30 is finally used to control the speed and improve the safety.

Next, an operation of the azimuth angle error estimating device of the radar system according to the first embodiment will be described with reference to FIG. 3. FIG. 3 is a diagram showing an example of distributions of the relative speed and azimuth angle of the reflecting points detected when the radar system according to the first embodiment of the present invention is mounted on the vehicle traveling along the traveling lane on the road;

Observed values of the reflecting points detected by the radar device 10 are stored in the storage section 21. The reflecting-point selecting section 22 selects two or more reflecting points that are thought to have substantially the same relative speeds in a traveling direction of the movable body with the characteristics of reflecting points being considered, from among the observed values of the reflecting points stored in the storage section 21. The characteristics of reflecting points are described as follows.

When a movable body, such as a vehicle, travels on a road surface, other vehicles, roadside objects such as traffic signs and guard rails, and the road surface can be radar reflectors.

The relative speeds of the road surfaces and the roadside objects are substantially equal to the speed "v" of the movable body. Other vehicles travel at different speeds, and thus the relative speeds thereof hold different values in many cases. As shown in FIG. 3, the relative speeds tend to be distributed in the vicinity of the speed "v" of the movable body.

The reflecting-point selecting section 22 first sets a median relative speed as a reference speed in the distribution of the relative speeds of the reflecting points stored in the storage section 21. The reflecting-point selecting section 22 then sets a range (called a speed gate) having a certain width with the reference speed set at the center. The reflecting-point selecting section 22 selects reflecting points having relative speeds that fall within in the range (speed gate) by assuming that the reflecting points have relative speeds in the traveling direction of the movable body, which are substantially equal to the reference speed.

The reflecting-point selecting section 22 may select reflecting points having relative speeds substantially equal to the speed "v" of the movable body by using a vehicle-speed detection device mounted on the movable body.

The azimuth angle error calculating section 23 calculates the azimuth angle error of the radar device 10 based on the observed azimuth-angle values of the reflecting points selected by the reflecting-point selecting section 22. To calculate the azimuth angle error, the formula (4) needs to be solved for "a". Since the formula (4) is a nonlinear equation, it is better to be solved by using a method of obtaining an approximate solution than by using an analytic method. Since various approximate-solution methods have been widely known, a description thereof is omitted here.

Hereinabove, the most basic characteristic of the azimuth angle error estimating device 20 according to the first embodiment of the present invention has been described. It is understood that the azimuth angle error can be calculated by only the components described above.

According to the formula (4), when relative speeds and observed azimuth-angle values of two reflecting points in the radar emission direction are obtained, the azimuth angle error may be calculated. However, when the reflecting-point selecting section 22 selects three or more reflecting points, combination of two reflecting points are selected from among those reflecting points, and the azimuth angle errors are calculated in the respective combinations. Then, the true azimuth-angle-error value estimating section 24 determines the final azimuth angle error. This operation will be described below.

The azimuth angle error calculating section 23 makes combinations of two reflecting points out of reflecting points selected by the reflecting-point selecting section 22, and calculates the azimuth angle errors from the respective combinations of the reflecting points.

For example, it is assumed that the reflecting-point selecting section 22 selects three reflecting points, that is, a first reflecting point, a second reflecting point, and a third reflecting point. The azimuth angle error calculating section 23 calculates the azimuth angle error from the combination of the first and second reflecting points, and sets the obtained azimuth angle error as a first azimuth angle error. The azimuth angle error calculating section 23 also calculates the azimuth angle error from either one of the combination of the first and third reflecting points and the combination of the second and third reflecting points, and sets the obtained azimuth angle error as a second azimuth angle error.

The true azimuth-angle-error value estimating section 24 estimates a true value of the azimuth angle error from the first azimuth angle error and the second azimuth angle error, which are calculated by the azimuth angle error calculating section 23. As a true azimuth-angle-error value estimation method, a method of calculating a mean value of the first azimuth angle error and the second azimuth angle error, an azimuth-angle-error calculation method such that the mean square error of the first azimuth angle error and the second azimuth angle error is made to be the least (least-square method), or a total least squares (TLS) method may be used, for example. The same applies to a case where the azimuth angle error calculating section 23 calculates three or more azimuth angle errors.

The true value of the azimuth angle error calculated in such a manner is finally output to the correcting device 30 as an output value of the azimuth angle error estimating device 20. The correcting device 30 calculates a value by dividing an observed value $\theta m'$ (m=1, 2, 3, ...) of the radar device 10 by a true value "a" of the azimuth angle error, and outputs the calculated value to an external device such as a speed control device, together with the distance, the relative speed, and the like.

In this way, with the provision of the true azimuth-angle-error value estimating section 24, the reliability of azimuth angle error estimation can be improved as the number of reflecting points to be used for azimuth angle error calculation increases.

As apparent from the above explanation, according to the radar system of the first embodiment of the present invention, the azimuth angle error of the radar device 10 may be estimated from observed values of plural reflecting points whose positions are unknown.

Note that when the radar device 10 observes reflecting points at predetermined sampling intervals, the azimuth angle error estimating device 20 may be configured such that an output of the true azimuth-angle-error value estimating section 24 is fed back to the azimuth angle error calculating section 23, and reflecting points to be selected are narrowed down through processing such as that performed by a Kalman filter.

Further, the reflecting-point selecting section 22 sets the relative speeds of any of the reflecting points as a reference speed, and may select, from the plural reflecting points stored in the storage section 21, the plural reflecting points having relative speeds that fall within a range having a predetermined width with this reference speed set at the center.

Further, the reflecting-point selecting section 22 sets the maximum value in a distribution of the relative speeds of the plural reflecting points as a reference speed, and may select, from the plural reflecting points stored in the storage section 21, the plural reflecting points having relative speeds which fall within a range having a predetermined width with the reference speed set at the center.

Further, the reflecting-point selecting section 22 obtains a range of relative speed in which the number of reflecting points is larger than a predetermined value, in a distribution of the relative speeds of the plural reflecting points, and may select, from the plural reflecting points stored in the storage section 21, the plural reflecting points having relative speeds which fall within the range.

Further, the reflecting-point selecting section 22 may select, from the plural reflecting points stored in the storage section 21, the plural reflecting points which are detected within a fixed period of time and have substantially equal relative speeds.

Further, the reflecting-point selecting section 22 may select, from the plural reflecting points stored in the storage section 21, the plural reflecting points which are detected by the radar device 10 within a predetermined range of changes in speed of the movable body and have substantially equal relative speeds.

Further, in stead of correcting the azimuth angles of the respective reflecting points based on the calculated azimuth angle error, the radar device 10 may correct the antenna direction based on the calculated azimuth angle error transmitted from the azimuth angle error calculating section 23.

Further, when the calculated azimuth angle error is larger than a predetermined range, the azimuth angle error calculating section 23 may judge that the failure occurred.

Further, when the azimuth angle error falls within the predetermined range, the azimuth angle of the reflecting point or the antenna direction may be corrected based on the calculated azimuth angle error. When the azimuth angle error does not fall within the predetermined range, it may be judged that the failure occurred.

Further, the azimuth angle error of the radar device 10 may be calculated from the distribution of the relative speeds and angles of reflecting points that are determined to be stationary objects from a speedometer mounted on the movable body mounting the radar device 10 thereon and the relative speeds of the reflection points, among plural reflecting points detected by the radar device 10.

Further, the azimuth angle error of the radar device 10 may be calculated from the distribution of relative speeds of reflection points that are determined to be an identical object, among plural reflecting points detected by the radar device 10.

Second Embodiment

Figure 4:
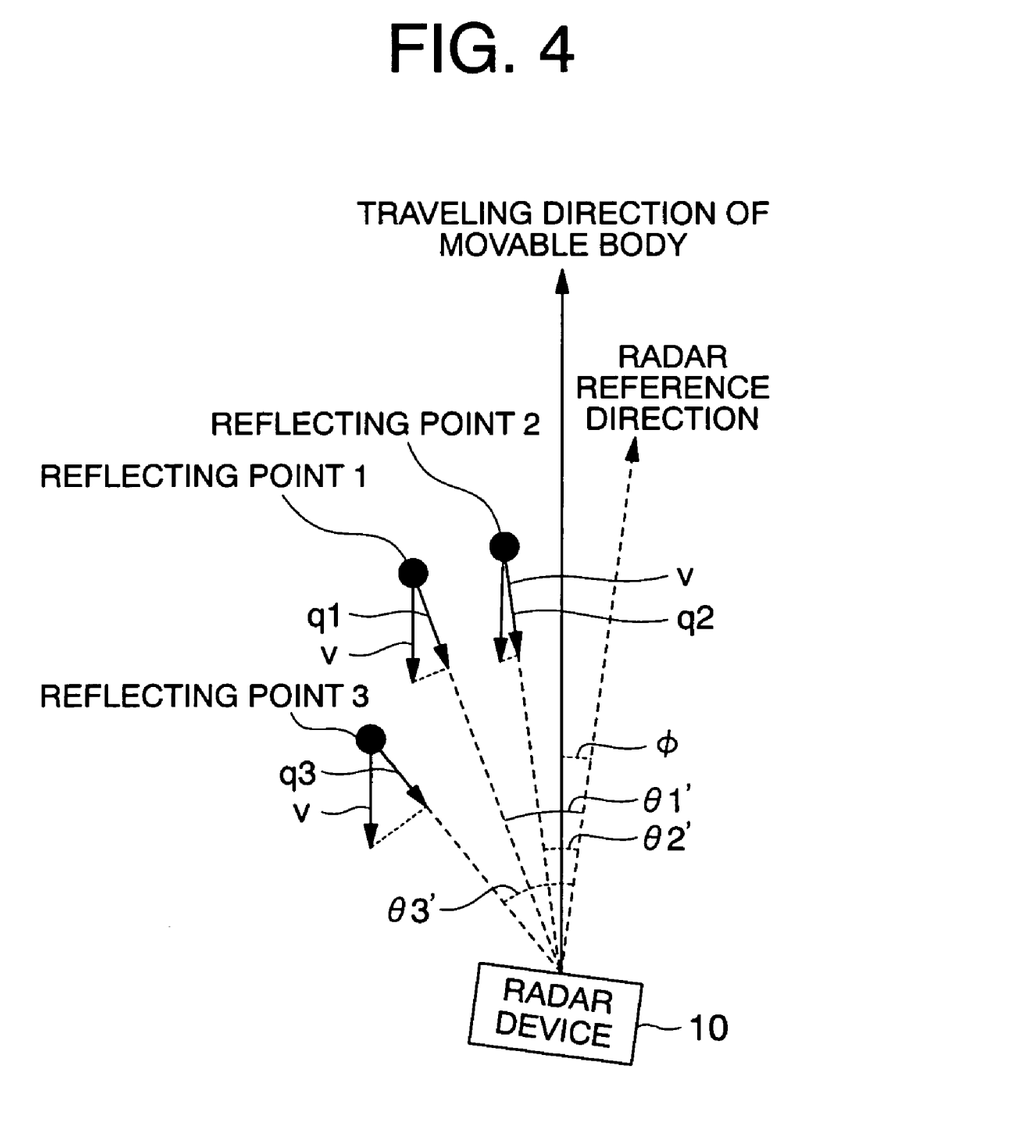
FIG. 4 is a diagram for explaining a principle of operation of a radar device of a radar system according to a second embodiment of the present invention.

A radar system according to a second embodiment of the present invention will be described with reference to FIGS. 4 and 5. FIG. 4 is a diagram for explaining a principle of operation of a radar device of the radar system according to the second embodiment of the present invention. Note that FIG. 1 shows a case where an axis deviation angle $\phi=0$, but FIG. 4 shows a case where an azimuth angle error "a"=1 for ease of understanding.

In FIG. 4, a radar device 10 is mounted on a movable body such as a vehicle. Reflecting points 1, 2, and 3 are radar-wave reflecting points detected by the radar device 10.

Here, the movable body mounting the radar device 10 thereon travels at an unknown speed "v" in its traveling direction. The radar device 10 has a predetermined radar reference direction. The radar reference direction is the reference direction of observed azimuth-angle values obtained by observing reflectors. It is preferred that the radar reference direction coincide with a traveling direction of the movable body, but a deviation is caused by an installation error. Here, an angle (axis deviation angle) made by the radar reference direction and a moving direction of the movable body is expressed by $\phi$. As in the first embodiment, it is assumed that an azimuth angle error exists, and the azimuth angle error is expressed by a primary expression such as the formula (1).

An azimuth-angle-error estimation method according to the present invention can be used to estimate not only an angle error in an azimuth direction but also an angle error in an elevation direction. However, for ease of explanation, only an azimuth component is described in this description.

For ease of explanation, it is assumed that all the reflecting points 1, 2, and 3 remain stationary and the movable body goes straight ahead at a speed "v". This case is equivalent to a case where all the reflecting points 1, 2, and 3 travel at a speed "v" while the movable body remains stationary. When q1 indicates the relative speed of the reflecting point 1 in the radar emission direction detected by the radar device 10 (the relative speed with respect to the radar device 10), q2 indicates the relative speed of the reflecting point 2 in the radar emission direction detected by the radar device 10 (the relative speed with respect to the radar device 10), θ1 indicates a true azimuth-angle value of the reflecting point 1, θ2 indicates a true azimuth-angle value of the reflecting point 2, θ1' indicates an observed azimuth-angle value of the reflecting point 1 detected by the radar device 10, and θ2' indicates the observed azimuth-angle value of the reflecting point 2 detected by the radar device 10, the relationships expressed by the following formulae (5) and (6) are established among v, $\phi$, θ1, θ1', q1, θ2, θ2', and q2, as apparent from FIG. 4.

$$q1 = v\cos(\theta1-\phi) = v\cos(\theta1'/a - \phi) \quad (5)$$

$$q2 = v\cos(\theta2-\phi) = v\cos(\theta2'/a - \phi) \quad (6)$$

As in the first embodiment, the formulae (5) and (6) need to be solved, but an unknown variable $\phi$ is included therein. When observed values q3 and θ3' of the reflecting point 3 are obtained, the following formula (7) is obtained like the formulae (5) and (6).

$$q3 = v\cos(\theta3-\phi) = v\cos(\theta3'/a - \phi) \quad (7)$$

The azimuth angle error "a" and the axis deviation angle $\phi$ can be obtained by solving the formulae (5) to (7). To solve the formulae (5) to (7), it is better to be solved by using a method of obtaining an approximate solution than by using an analytic method. Since various approximate-solution methods have been widely known, a description thereof is omitted here.

Figure 5:
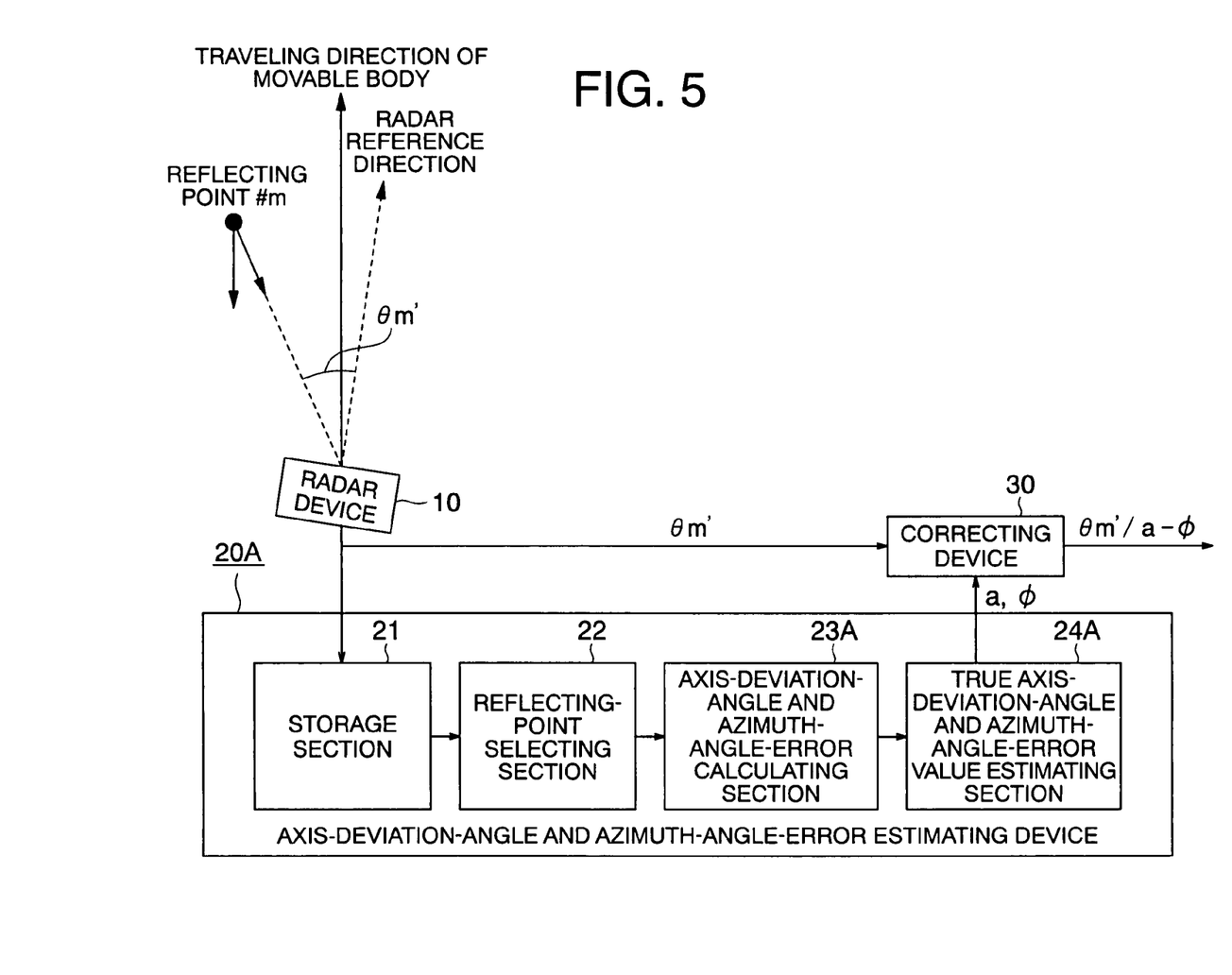
FIG. 5 is a block diagram showing a structure of the radar system according to the second embodiment of the present invention.

FIG. 5 is a block diagram showing a structure of the radar system according to the second embodiment of the present invention.

In FIG. 5, the radar system according to the second embodiment of the present invention is functionally equivalent to the radar system described in the above explanation of the principle of operation. Provided in the radar system are a radar device 10 having an antenna; an axis-deviation-angle and azimuth-angle-error estimating device 20A which estimates an axis deviation angle and an azimuth angle error of the radar device 10; and a correcting device 30 which corrects an observed azimuth-angle value of a reflector based on the observed value calculated by the radar device 10, the axis deviation angle, and the estimated azimuth-angle-error value calculated by the axis-deviation-angle and azimuth-angle-error estimating device 20A, and outputs the correction result.

In the axis-deviation-angle and azimuth-angle-error estimating device 20A, a storage section 21, a reflecting-point selecting section 22, an axis-deviation-angle and azimuth-angle-error calculating section 23A, and a true axis-deviation-angle and azimuth-angle-error value estimating section 24A are provided.

The storage section 21 stores observed values such as relative speeds and azimuth angles of reflecting points, which are calculated by the radar device 10. The reflecting-point selecting section 22 selects, from among observed values of the reflecting points stored in the storage section 21, observed values to be used for axis-deviation-angle and azimuth-angle-error calculation. The axis-deviation-angle and azimuth-angle-error calculating section 23A uses the observed values selected by the reflecting-point selecting section 22 to calculate an axis deviation angle and an azimuth angle error. When plural axis deviation angles (candidate values for the axis deviation angle) and plural azimuth angle errors (candidate values for the azimuth angle error) are calculated by the axis-deviation-angle and azimuth-angle-error calculating section 23A, the true axis-deviation-angle and azimuth-angle-error value estimating section 24A estimates the true values of the axis deviation angle and the azimuth angle error by using the plural axis deviation angle candidate values and azimuth angle error candidate values.

Note that each of the above components may be directly configured by hardware such as an element or a circuit for implementing a predetermined function and process, or may be configured by software using a general-purpose CPU, DSP, or the like. Operations of the above components are the same as those of the components of the first embodiment.

The correcting device 30 corrects an observed azimuth-angle value of a reflector based on an observed value θm' calculated by the radar device 10 and the axis deviation angle φ and the estimated azimuth-angle-error value "a" calculated by the axis-deviation-angle and azimuth-angle-error estimating device 20A, and outputs the correction result. Specifically, the correcting device 30 divides the observed value θm' (m=1, 2, 3, ...) calculated by the radar device 10 by the true value "a" of the azimuth angle error, subtracts the axis deviation angle φ therefrom, and outputs the result to an external device such as a speed control device, together with a distance, a relative speed, and the like. The output of the correcting device 30 is finally used to control the speed and improve the safety.

As apparent from the above explanation, according to the radar system of the second embodiment of the present invention, the axis deviation angle and azimuth angle error of the radar device 10 can be simultaneously estimated from the observed values of the plural reflecting points whose positions are unknown.

What is claimed is:

1. A radar system to be mounted on a movable body, comprising:
    a radar device for calculating relative speeds and angles of plural reflecting points; and
    an angle error estimating device for estimating errors of the angles calculated by the radar device based on the relative speeds and the angles of the plural reflecting points.

2. A radar system according to claim 1, wherein:
the angle error estimating device comprises:
    a storage section for storing the relative speeds and the angles of the plural reflecting points calculated by the radar device;
    a reflecting-point selecting section for selecting at least two reflecting points from among the plural reflecting points stored in the storage section; and
    an angle error calculating section for calculating an angle error based on the relative speeds and the angles of the at least two reflecting points selected by the reflecting-point selecting section.

3. A radar system according to claim 2, wherein:
the reflecting-point selecting section selects, from the plural reflecting points stored in the storage section, at least two reflecting points having substantially equal relative speeds.

4. A radar system according to claim 2, wherein:
the reflecting-point selecting section sets the relative speeds of at least one of the reflecting points as a reference speed, and selects, from the plural reflecting points stored in the storage section, at least two reflecting points having relative speeds which fall within a range having a predetermined width with the reference speed set at the center.

5. A radar system according to claim 2, wherein:
the reflecting-point selecting section sets a median in a distribution of the relative speeds of the plural reflecting points as a reference speed, and selects, from the plural reflecting points stored in the storage section, at least two reflecting points having relative speeds which fall within a range having a predetermined width with the reference speed set at the center.

6. A radar system according to claim 2, wherein:
the reflecting-point selecting section sets a maximum value in a distribution of the relative speeds of the plural reflecting points as a reference speed, and selects, from the plural reflecting points stored in the storage section, at least two reflecting points having relative speeds which fall within a range having a predetermined width with the reference speed set at the center.

7. A radar system according to claim 2, wherein:
the reflecting-point selecting section obtains a range of relative speed in which the number of reflecting points is larger than a predetermined value, in a distribution of the relative speeds of the plural reflecting points, and selects, from the plural reflecting points stored in the storage section, at least two reflecting points having relative speeds which fall within the range.

8. A radar system according to claim 2, wherein:
the reflecting-point selecting section selects, from the plural reflecting points stored in the storage section, at least two reflecting points which are detected within a fixed period of time and have substantially equal relative speeds.

9. A radar system according to claim 2, wherein:
the reflecting-point selecting section selects, from the plural reflecting points stored in the storage section, at least two reflecting points which are detected within a predetermined range of changes in speed of the movable body and have substantially equal relative speeds.

10. A radar system according to claim 2, wherein:
the angle error estimating device further comprises a true angle-error value estimating section for estimating a true angle-error value by using plural angle errors when the angle error calculating section calculates plural angle errors.

11. A radar system according to claim 10, wherein:
the true angle-error value estimating section calculates a mean value of the plural angle errors and estimates the mean value as a true angle-error value.

12. A radar system according to claim 10, wherein:
the true angle-error value estimating section calculates an angle error that minimizes a mean square error of the plural angle errors and estimates the calculated angle error as a true angle-error value.

13. A radar system according to claim 1, further comprising a correcting device for correcting the angle calculated by the radar device by using the angle error estimated by the angle error estimating device.

14. A radar system according to claim 1, wherein the radar device corrects an antenna direction based on the calculated angle error.

15. A radar system according to claim 2, wherein the angle error calculating section judges that a failure occurs when the calculated angle error exceeds a predetermined range.

16. A radar system to be mounted on a movable body, comprising:

a radar device for calculating relative speeds and angles of plural reflecting points; and an angle error estimating device for estimating errors of the angles calculated by the radar device and an axis deviation angle in a radar reference direction, based on the relative speeds and the angles of the plural reflecting points.

* * * * *